R. W. SELLEW.
BALL BEARING.
APPLICATION FILED OCT. 19, 1920.
1,375,021.
Patented Apr. 19, 1921.
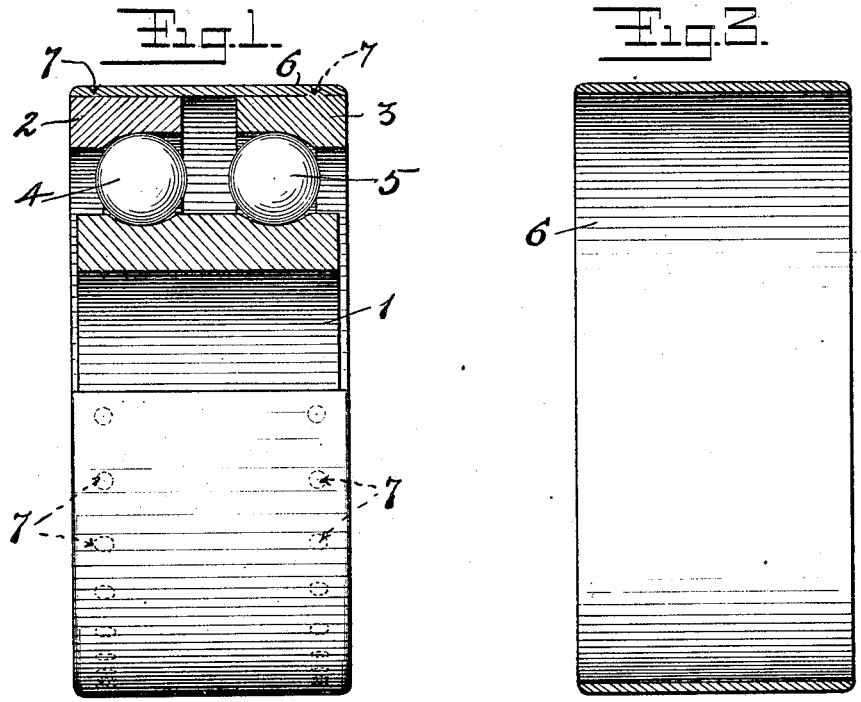
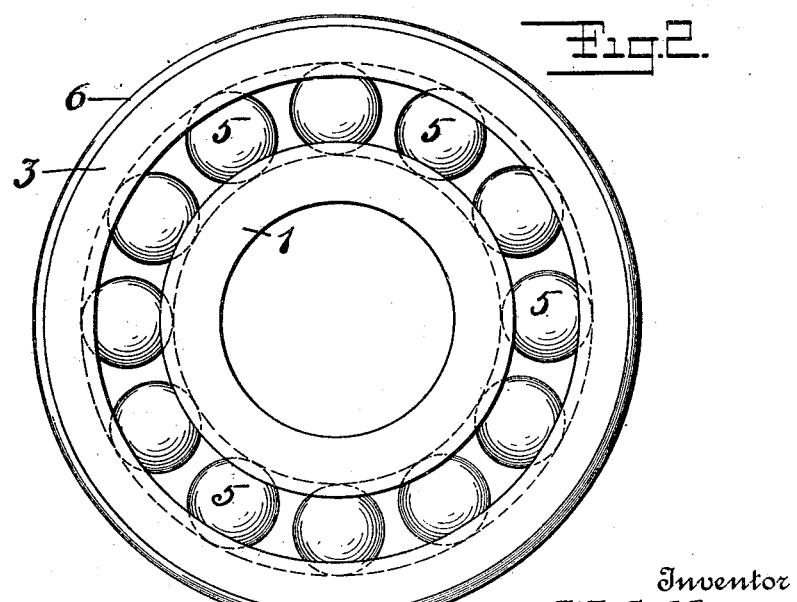
Inventor
R. W. Sellew
By his Attorneys

A
UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,375,021.        Specification of Letters Patent.        Patented Apr. 19, 1921.

Application filed October 19, 1920. Serial No. 417,946.

*To all whom it may concern:*

Be it known that I, ROLAND W. SELLEW, a citizen of the United States of America, residing at New Britain, Connecticut, have invented a new and useful Ball-Bearing, of which the following is a specification.

My invention relates to improvements in ball bearing construction, said invention being particularly applicable to ball bearings of the double row type in that it permits the bearings to be assembled with speed and accuracy.

In the drawings:

Figure 1 is an edge elevation of a bearing shown partly in cross section.

Fig. 2 is a side elevation of said bearing.

Fig. 3 is a section of a detail.

1 represents the inner ring of a ball bearing having proper ball races on the outer surface. 2—3 represent two outer ring sections each of which has a ball race-way complementary to the race-way on the ring 1. 4—5 are balls of two separate rows. The spacing between the rows may be varied at will where two rows are employed. 6 is a sleeve arranged to fit snugly on to the two outer ring sections 2—3, and to form the external surface of the outer bearing ring.

In assembling the bearing the sections 2—3 may be loosely positioned so that the balls 4—5 may be easily introduced. When said balls are in place in the race-ways the two sections 2—3 are moved toward each other, the sleeve 6 is slipped into place, the two sections 2—3 are held against the balls with the desired pressure and then the sleeve 6 is welded to the two ring sections 2—3. This welding may be accomplished by the well known spot welding process, said welding occurring at any suitable intervals, the spots being conventionally illustrated at 7—7.

By this form of construction there is no danger of deforming the bearing rings by welding heat. The finished structure possesses the advantage that no amount of wear will result in loosening the ring sections 2—3 with relation to the sleeve 6 or with relation to each other. Again, bearings of this type may be readily designed so as to withstand effectively not only radial but also thrust loads. While of course this invention may be applied to the manufacture of a single row bearing, it has particular utility when employed in connection with a double row bearing, and for that reason I have elected to illustrate the same as applied to that type of bearing. The balls themselves in such a bearing make a point contact with the race-ways preferably in opposite oblique directions as shown, thereby better withstanding the crowding action of thrust. The particular angle of deflection of the bearing points may be varied at will. By this invention further economies may be obtained in that the width of each outer bearing ring may be substantially less than one-half the width of the completed bearing as shown in the drawings, (Fig. 1), thereby saving substantially in metal. This also reduces the weight of the bearing, this saving in metal and weight being accomplished without sacrifice to strength or durability. I have indicated that spot welding so-called, is preferable although I do not wish to limit myself solely thereto.

While I have shown the outer ring element as the one made up of two sections, it is perfectly obvious that this might be the inner ring element, in which event the sleeve would be internal instead of external. This modification is too obvious to require illustration and constitutes a mere alternative arrangement, although I believe the particular arrangement shown is preferable as it lends greater accessibility to the welding process and apparatus.

By spacing the two ring sections 2—3 apart a further advantage is gained in that it affords a convenient oil or grease pocket to hold a quantity of oil or lubricant greater than would otherwise be possible.

What I claim is:

1. In a ball bearing, two bearing rings, one of said rings being formed of two sections, complementary ball races on the opposing faces of said rings, and a sleeve engaging the two ring sections, said sleeve being welded thereto.

2. In a ball bearing, two bearing rings having complementary race-ways therein, one of said rings comprising two ring sections, and a sleeve spanning said two ring sections and welded thereto.

3. In a ball bearing, two bearing rings having complementary race-ways therein, one of said rings comprising two ring sections, a sleeve spanning said two ring sections and welded thereto, said ring sections being spaced apart from each other circumferentially of the bearing.

4. In a ball bearing, two bearing rings having complementary race-ways, the outer ring comprising two separate ring sections, and a sleeve surrounding said ring sections and welded thereto.

5. In a ball bearing, two bearing rings adapted to hold balls therebetween, one of said rings comprising two sections, and a sleeve welded to one of said sections.

6. In a ball bearing, two bearing rings having complementary race-ways therein, one of said rings comprising two ring sections, and a sleeve spanning said two ring sections and welded thereto, and serving to hold said sections spaced apart to form a pocket.

7. In a ball bearing, two bearing rings having complementary race-ways therein, one of said rings comprising two sections, and a sleeve spanning said two sections and spot welded thereto.

ROLAND WINCHESTER SELLEW.